United States Patent
Bess

(10) Patent No.: US 12,274,396 B2
(45) Date of Patent: Apr. 15, 2025

(54) PORTABLE COMBINATION GRILL AND SMOKER DEVICE

(71) Applicant: Christopher Bess, Austin, TX (US)

(72) Inventor: Christopher Bess, Austin, TX (US)

( * ) Notice: Subject to any disclaimer, the term of this patent is extended or adjusted under 35 U.S.C. 154(b) by 467 days.

(21) Appl. No.: 17/860,869

(22) Filed: Jul. 8, 2022

(65) Prior Publication Data

US 2024/0008682 A1    Jan. 11, 2024

(51) Int. Cl.
*A47J 37/07* (2006.01)
*A23B 4/052* (2006.01)
*A47J 37/06* (2006.01)

(52) U.S. Cl.
CPC .......... *A47J 37/0763* (2013.01); *A23B 4/052* (2013.01); *A47J 37/0736* (2013.01); *A23B 4/0523* (2013.01); *A47J 37/0629* (2013.01); *A47J 37/0664* (2013.01); *A47J 37/0709* (2013.01); *A47J 37/0713* (2013.01)

(58) Field of Classification Search
CPC ................ A47J 37/0763; A47J 37/0736; A47J 37/0713; A47J 37/0709; A47J 37/0664; A47J 37/0629; A23B 4/0523; A23B 4/052
USPC ...................................................... 126/25 R
See application file for complete search history.

(56) References Cited

U.S. PATENT DOCUMENTS

| | | |
|---|---|---|
| 3,851,639 A | 12/1974 | Beddoe |
| 4,554,864 A * | 11/1985 | Smith ................. A47J 37/0709 99/417 |
| 4,878,476 A | 11/1989 | Oliphant |
| 5,070,776 A | 12/1991 | Schlosser |
| 6,543,435 B1 | 4/2003 | Regen |
| 7,301,127 B1 | 11/2007 | Derridinger, Jr. |
| D732,334 S | 6/2015 | Bradford, Jr. |
| 10,624,358 B2 | 4/2020 | Akinbobola |
| 10,849,457 B2 | 12/2020 | Bell |
| 2006/0254433 A1* | 11/2006 | Oberlander ......... A47J 37/0704 99/448 |
| 2008/0066733 A1* | 3/2008 | Wahl ................... A47J 37/0704 126/41 R |
| 2008/0098902 A1* | 5/2008 | Mansfield ........... A47J 37/0786 99/341 |
| 2010/0089248 A1 | 4/2010 | Jones |
| 2014/0007778 A1* | 1/2014 | Marks ................. A47J 37/0704 126/25 R |
| 2016/0374509 A1* | 12/2016 | Blomberg .............. A23B 4/044 99/331 |

FOREIGN PATENT DOCUMENTS

CA    2127783    1/1996

* cited by examiner

*Primary Examiner* — Steven B McAllister
*Assistant Examiner* — Benjamin W Johnson

(57) ABSTRACT

A portable combination grill and smoker device for portably cooking using a combination of smoking and grilling includes a grill compartment in environmental communication with a wood chip box and a smoker cabinet and having attachable gas burners and an attachable electric heating element. The grill compartment is coupled to a base with a plurality of wheels for movably positioning the device on a support surface and a hitch mount for removably coupling to a standard hitch receiver for transport. The device is configured for cooking food using one or more of smoking, charcoal grilling, gas grilling, and electric grilling simultaneously.

18 Claims, 12 Drawing Sheets

PORTABLE COMBINATION GRILL AND SMOKER DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to portable cooking devices and more particularly pertains to a new portable cooking device for portably cooking using a combination of smoking and grilling.

(2) Description of Related Art Including Information Disclosed Under 37 CFR 1.97 and 1.98

The prior art relates to portable cooking devices which utilize a variety of cooking methods within the same device. Some devices are able to switch between cooking methods, and others are able to combine cooking methods simultaneously. However, the devices in the prior art suffer from myriad shortcomings that present the opportunity for continued invention. For example, in seeking to be portable, several prior art devices have resorted to complex configurations requiring assembly, disassembly, and other setup to switch between cooking methods or to prepare the device for use. The prior art devices also resort to means of transporting the device that involve a user carrying the device, with or without a handle, that present natural limits of ability and comfort for use by human beings. Additionally, many of the devices in the prior art make available only one cooking surface for using one cooking method or combination of cooking methods, ignoring the possibility that a user may want to have multiple portions of food cooked simultaneously by the device using different methods for each portion of food. As such, the prior art does not present a solution which provides a variety of cooking methods which can be used individually, in combination, or in parallel which requires minimum setup and does not suffer from limitations of the carrying capacity of the user.

BRIEF SUMMARY OF THE INVENTION

An embodiment of the disclosure meets the needs presented above by generally comprising a grill compartment in environmental communication with a wood chip box and a smoker cabinet and having attachable gas burners and an attachable electric heating element. The grill compartment is coupled to a base with a plurality of wheels for movably positioning the device on a support surface and a hitch mount for removably coupling to a standard hitch receiver for transport. The device is configured for cooking food using one or more of smoking, charcoal grilling, gas grilling, and electric grilling simultaneously.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
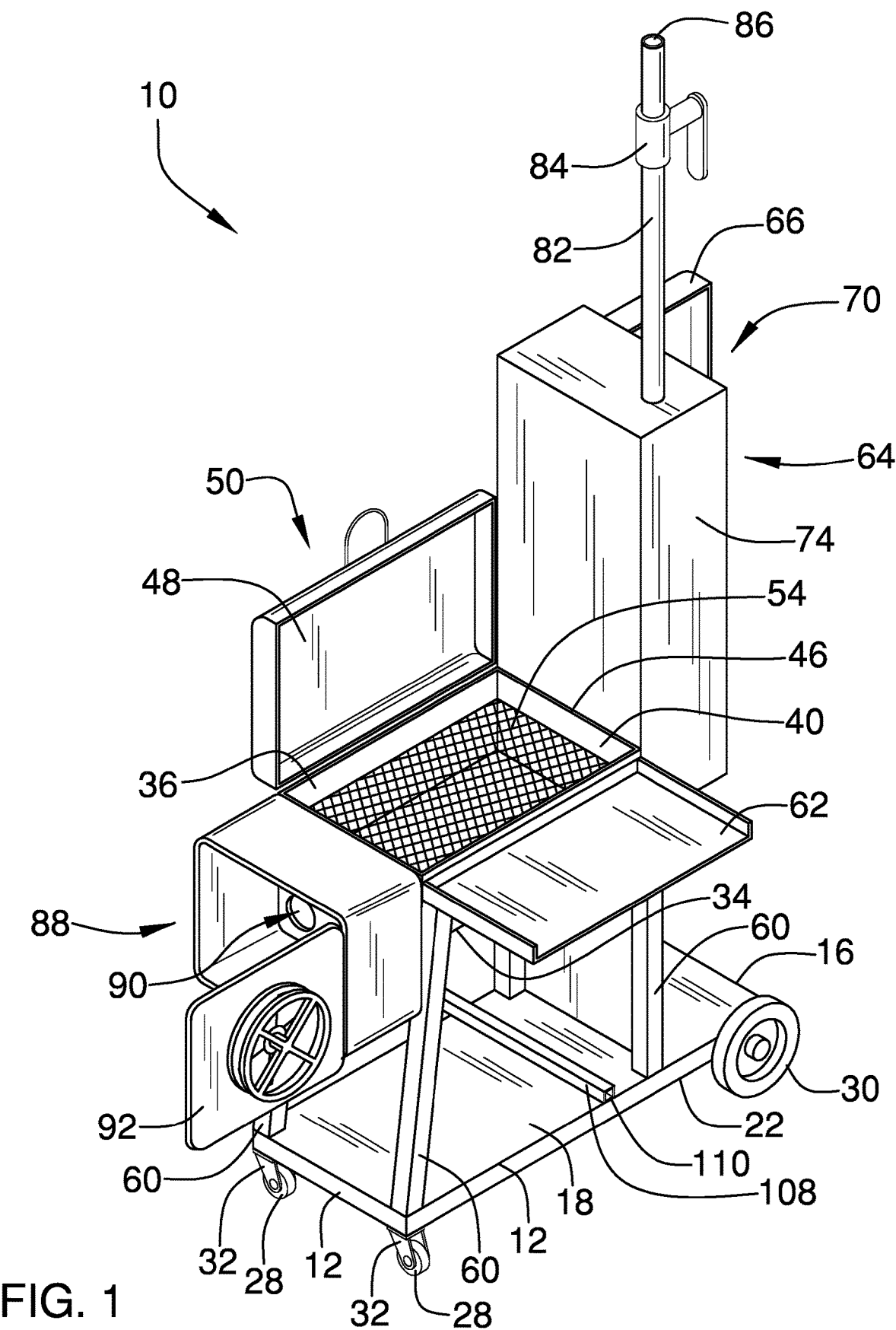
FIG. 1 is a top front side perspective view of a portable combination grill and smoker device according to an embodiment of the disclosure.
Figure 2:
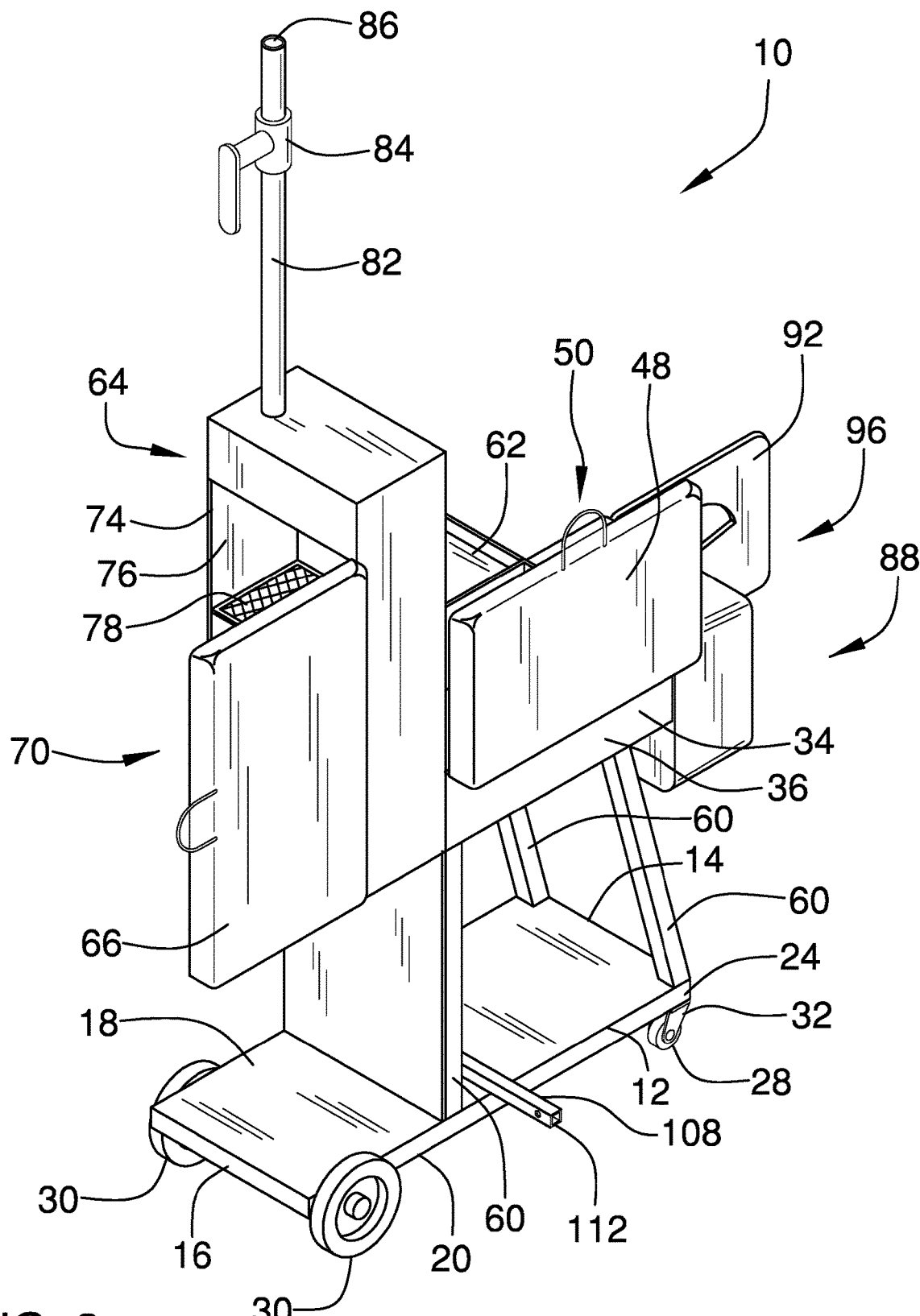
FIG. 2 is a top rear side perspective view of an embodiment of the disclosure.
Figure 3:
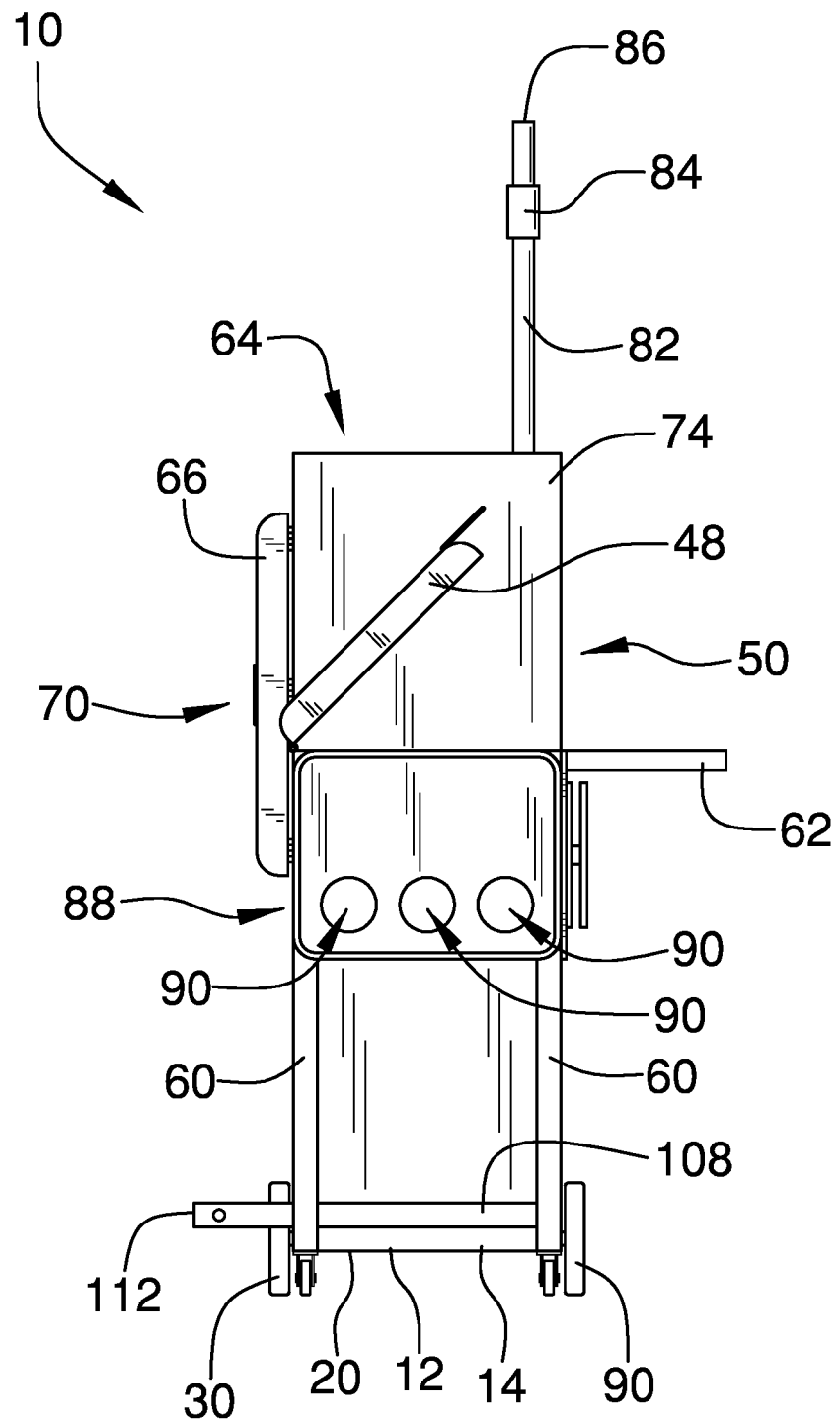
FIG. 3 is a first side view of an embodiment of the disclosure.
Figure 4:
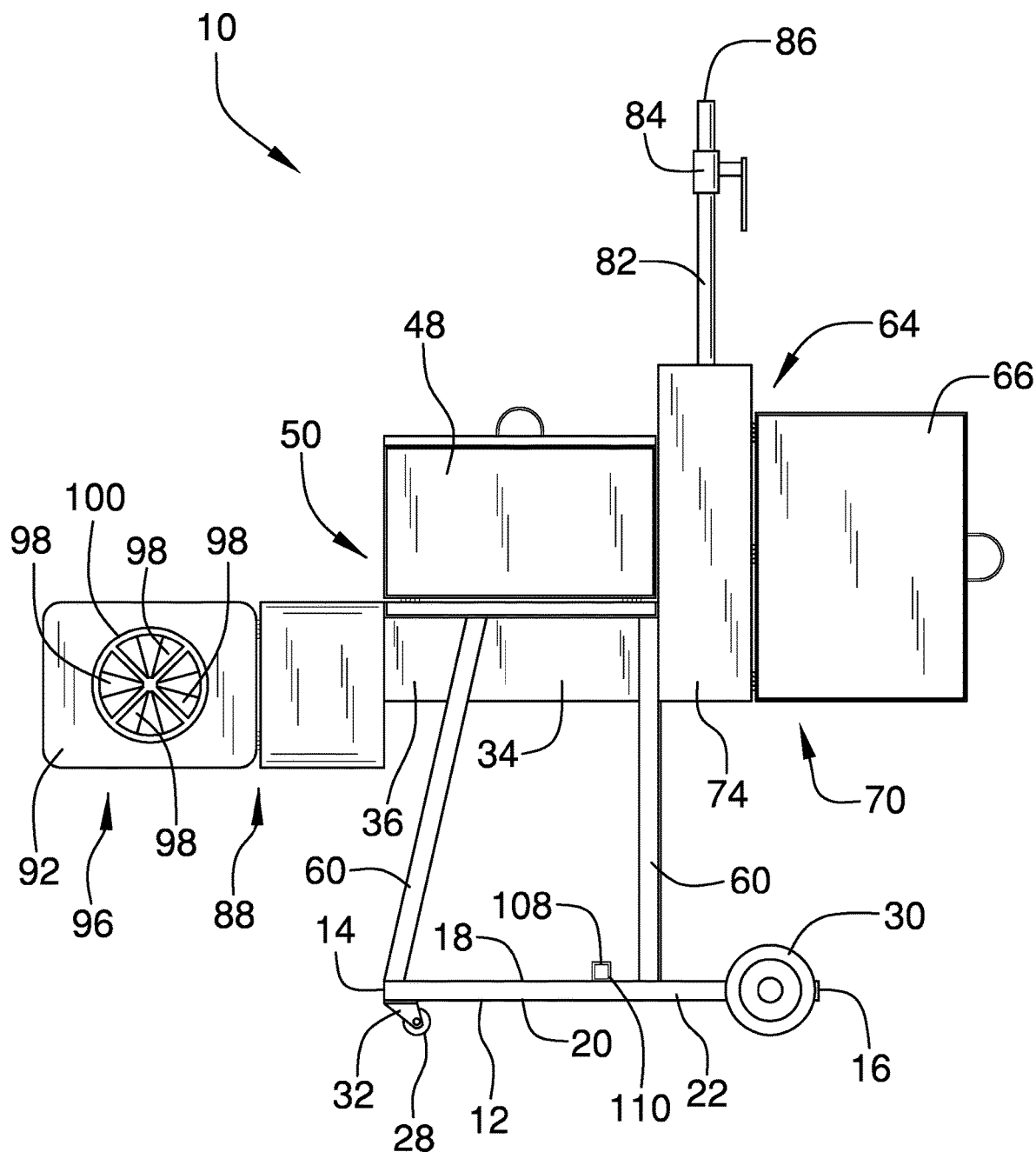
FIG. 4 is a front view of an embodiment of the disclosure.
Figure 5:
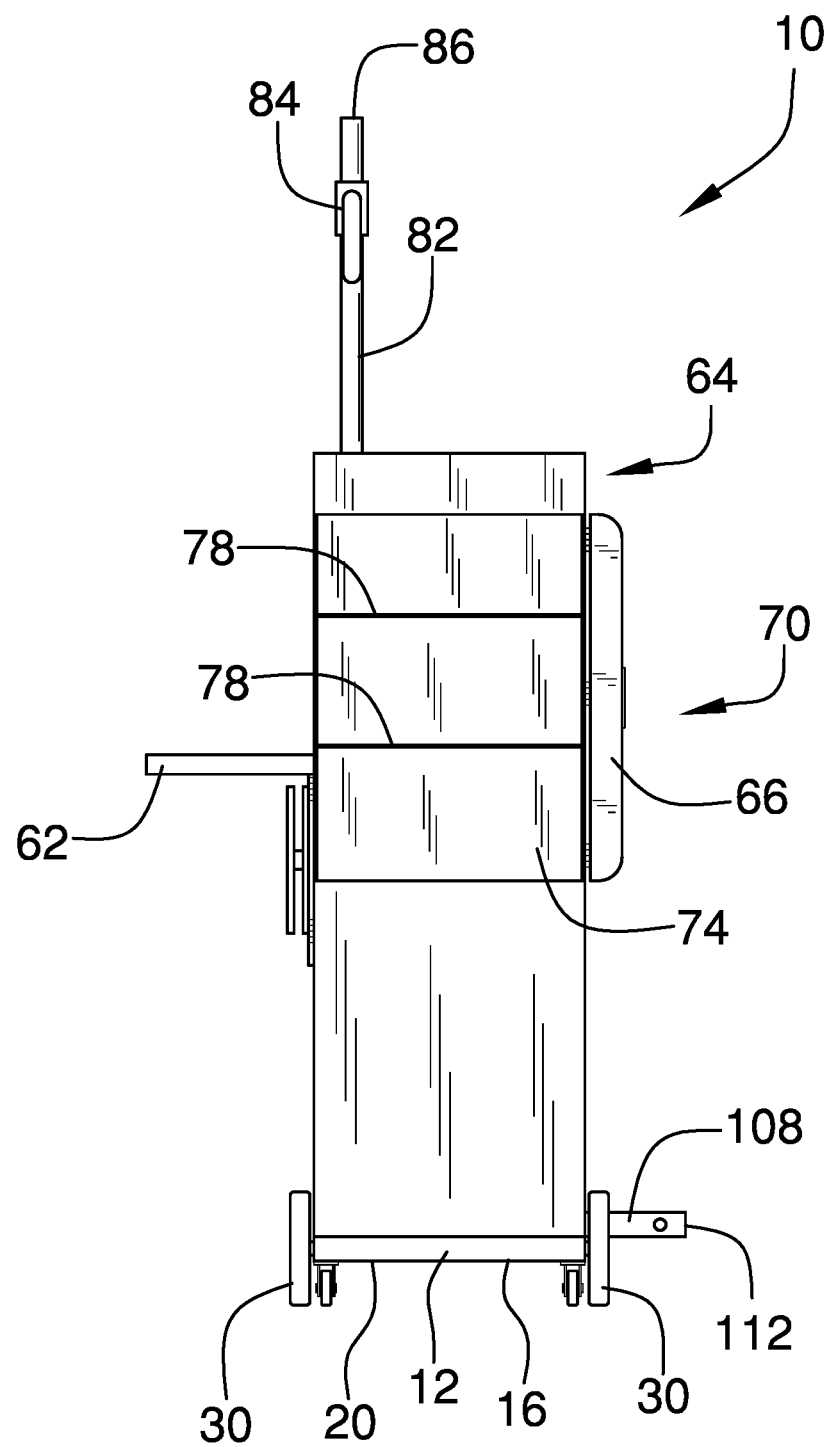
FIG. 5 is a second side view of an embodiment of the disclosure.
Figure 6:
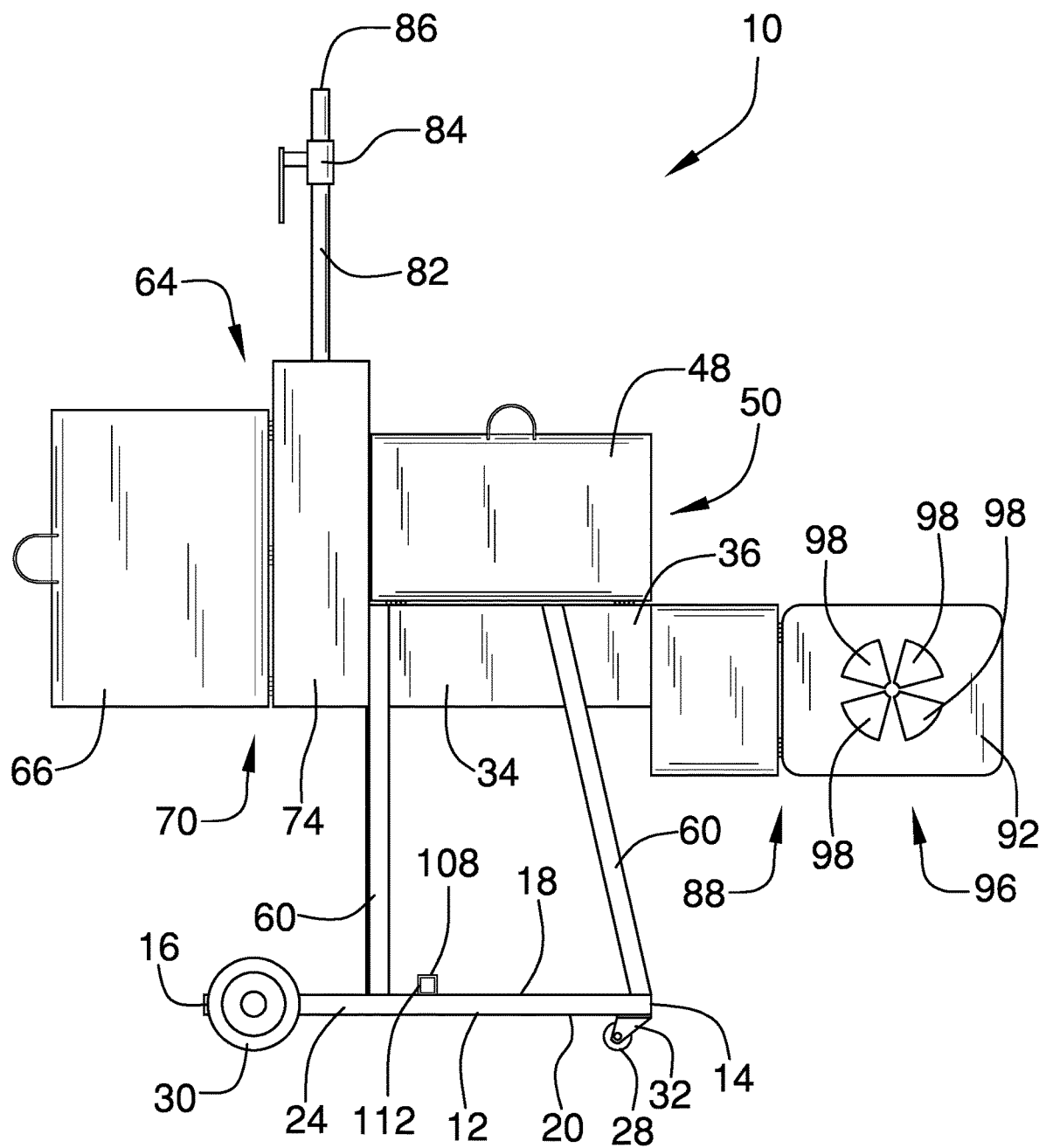
FIG. 6 is a rear view of an embodiment of the disclosure.
Figure 7:
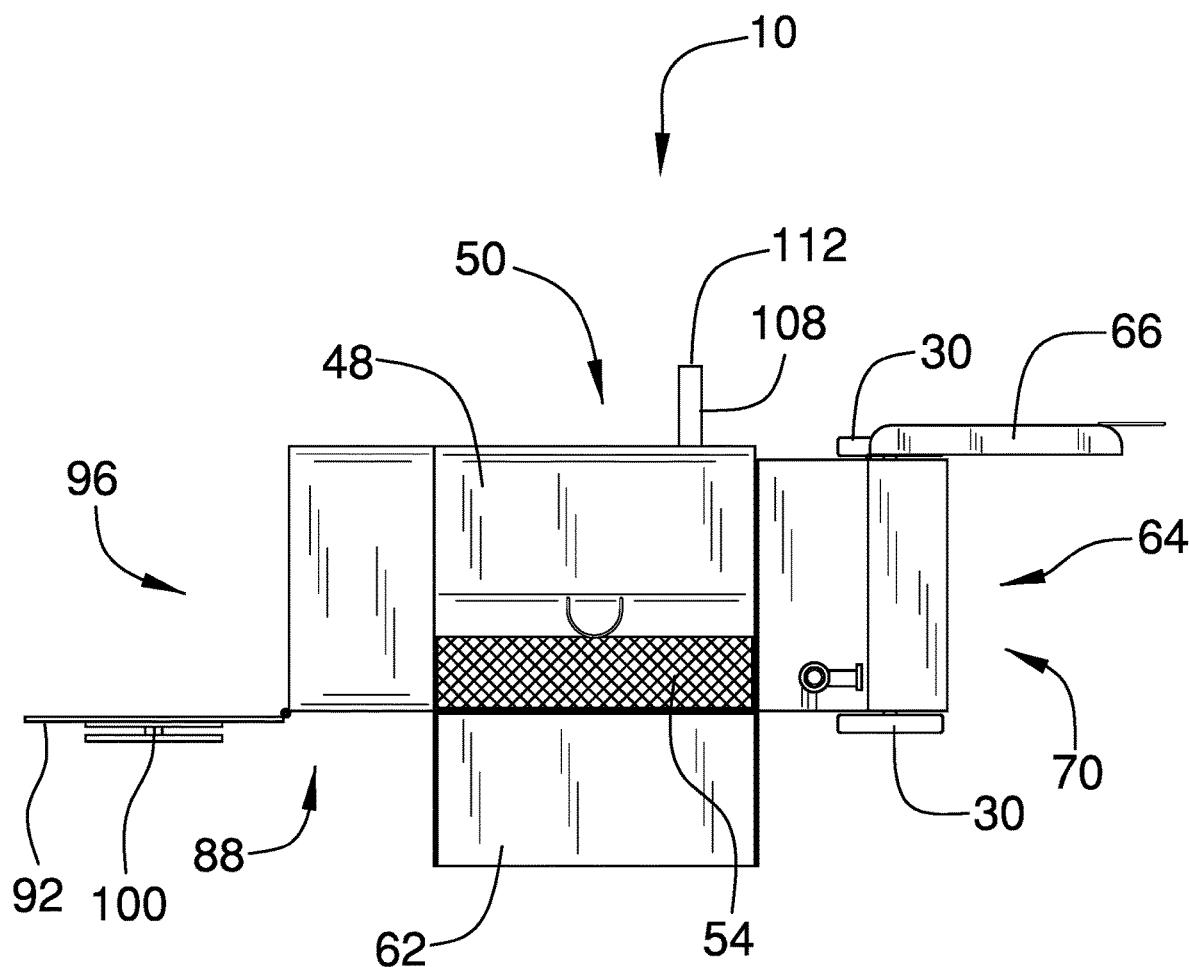
FIG. 7 is a top view of an embodiment of the disclosure.
Figure 8:
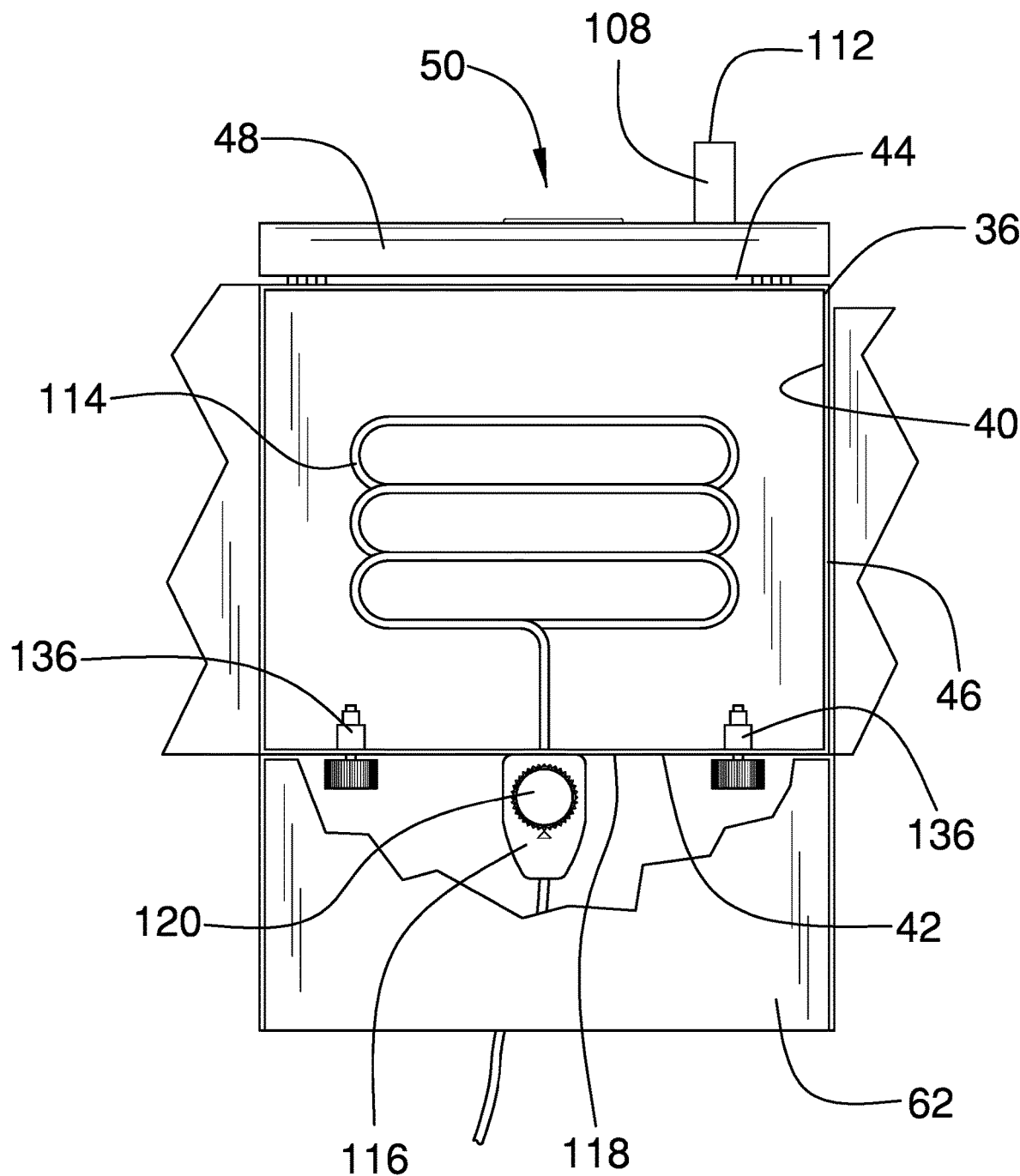
FIG. 8 is a partial cross-section top view of an embodiment of the disclosure with the electric heating element coupled to the grill compartment.
Figure 9:
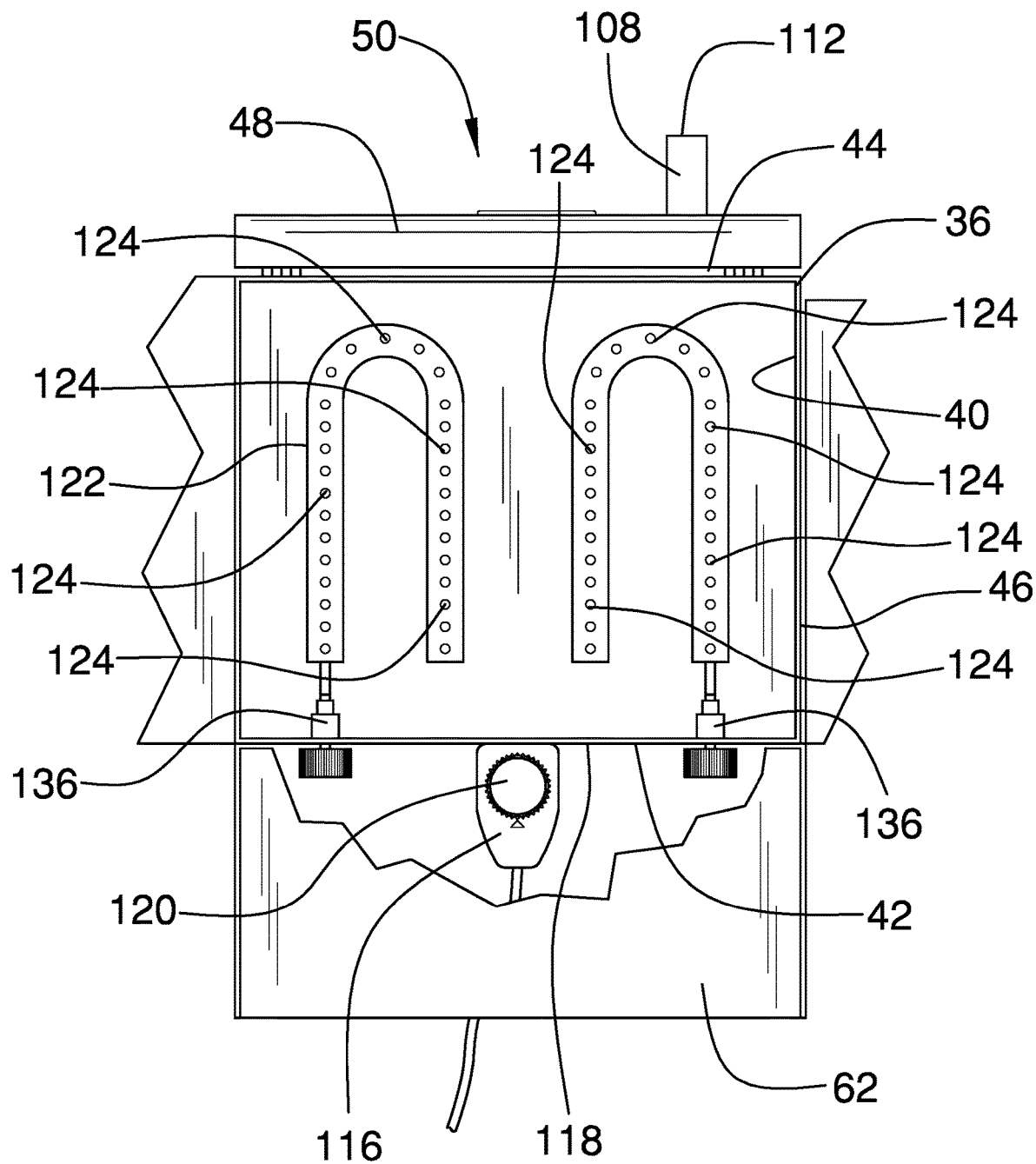
FIG. 9 is a partial cross-section top view of an embodiment of the disclosure with the plurality of gas burners coupled to the grill compartment.
Figure 10:
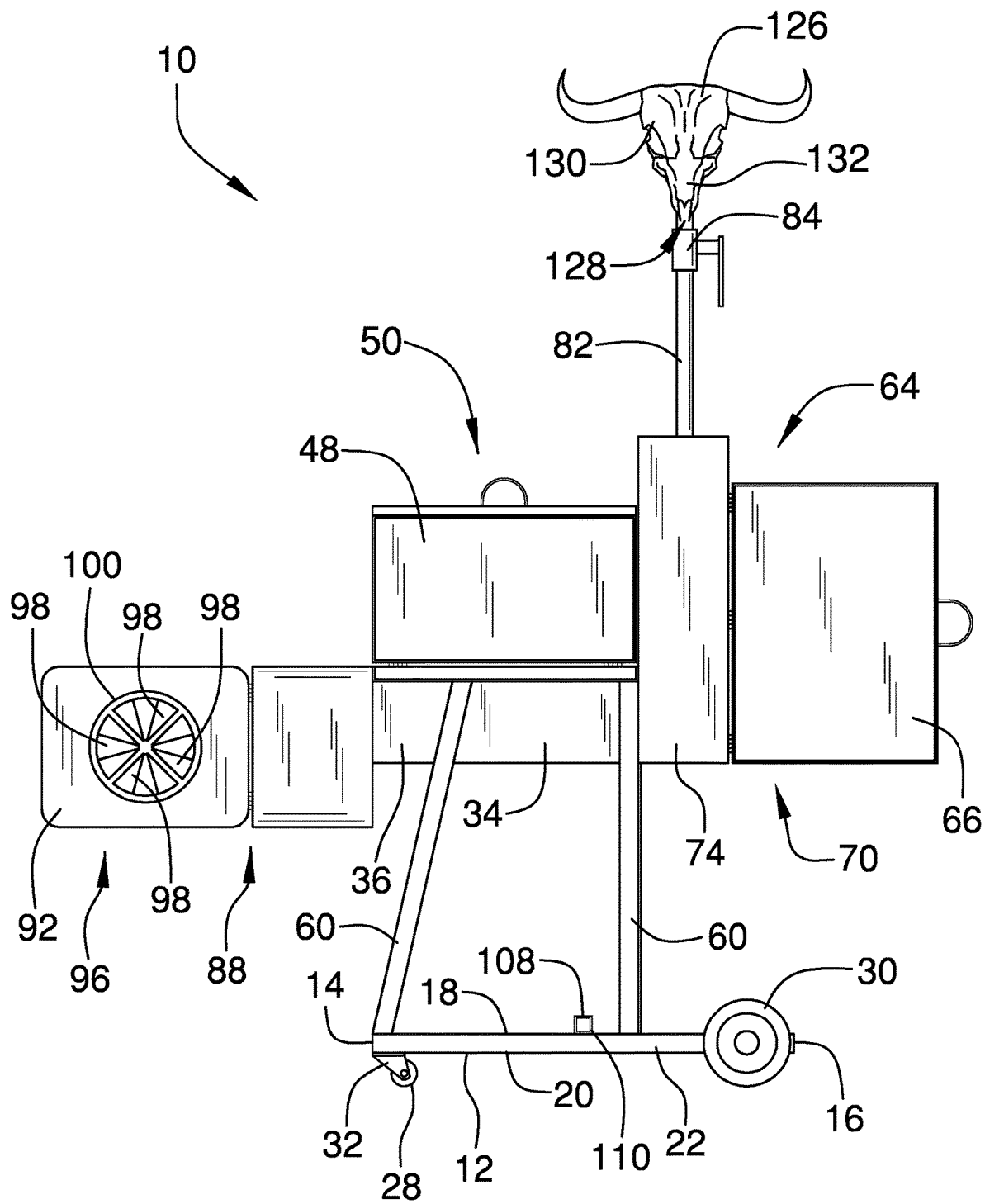
FIG. 10 is a front view of an alternative embodiment of the disclosure.
Figure 11:
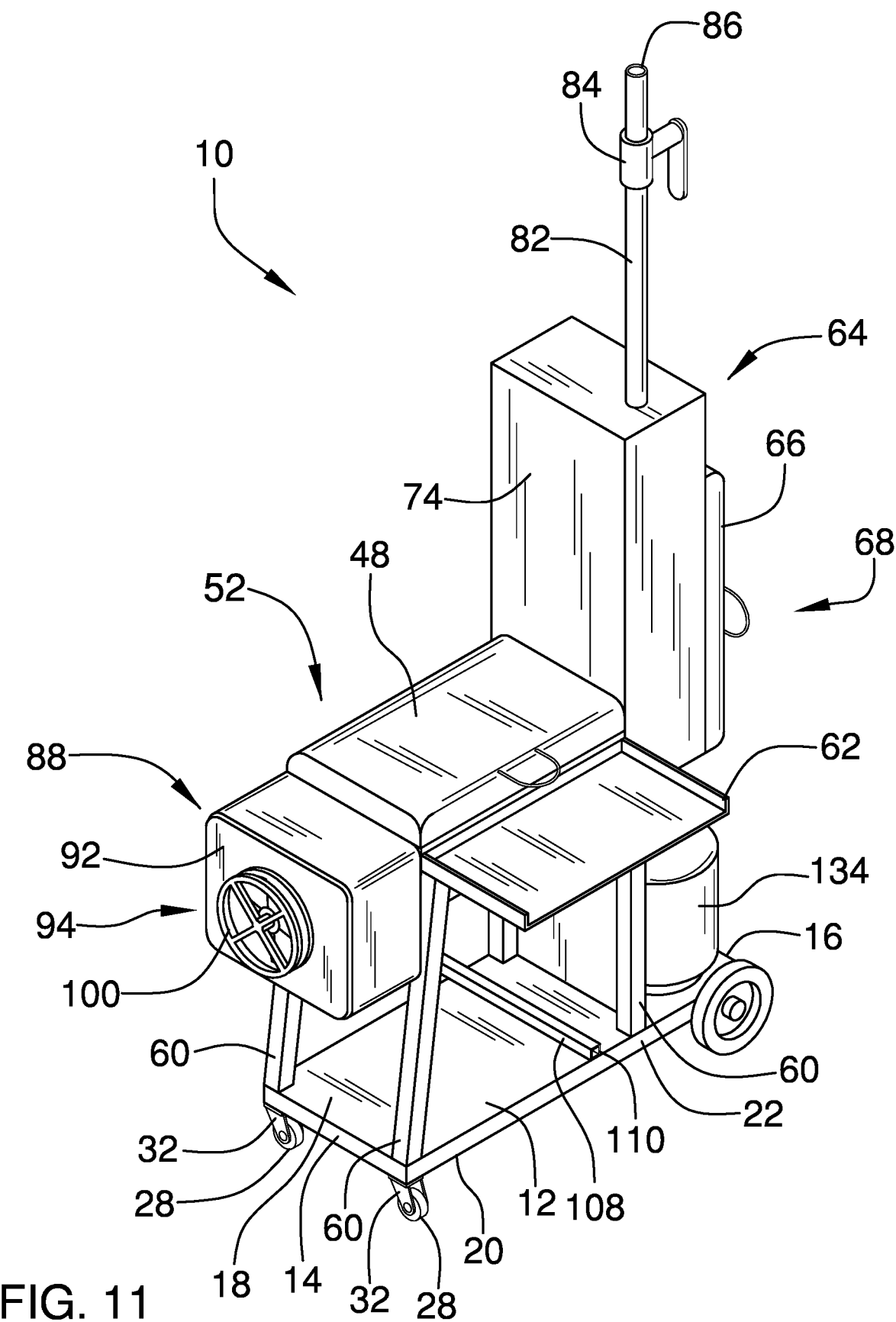
FIG. 11 is an in-use view of an embodiment of the disclosure wherein the device is being used for cooking.
Figure 12:
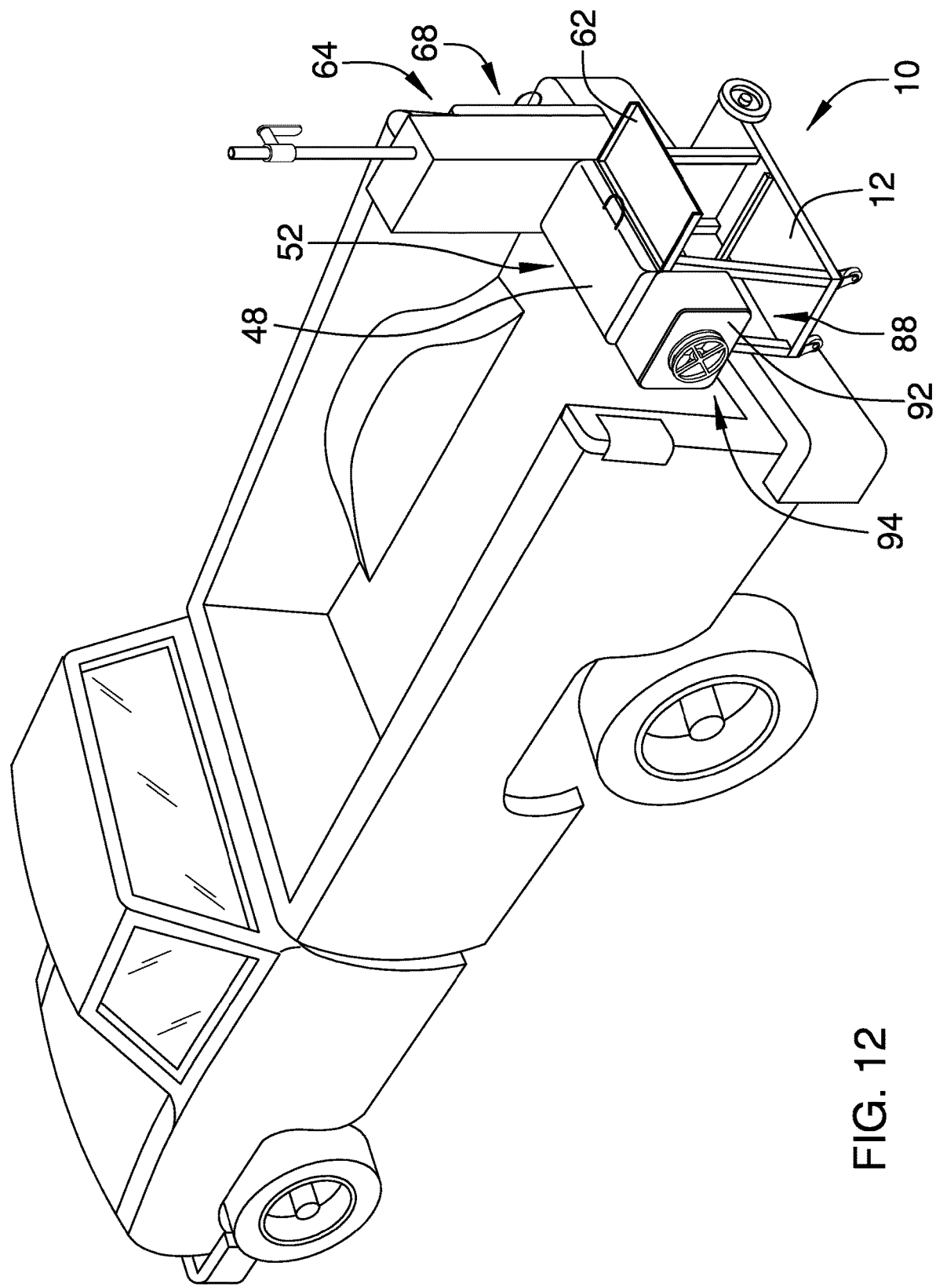
FIG. 12 is an in-use view of an embodiment of the disclosure wherein the device is being transported.

With reference now to the drawings, and in particular to FIGS. 1 through 12 thereof, a new portable cooking device embodying the principles and concepts of an embodiment of the disclosure and generally designated by the reference numeral 10 will be described.

As best illustrated in FIGS. 1 through 12, the portable combination grill and smoker device 10 generally comprises a base 12, wherein the base 12 extends from a first end 14 of the base 12 to a second end 16 of the base 12, each of a top side 18 of the base 12 and a bottom side 20 of the base 12 extend from the first end 14 of the base 12 to the second end 16 of the base 12, and each of a front side 22 of the base 12 and back side 24 of the base 12 extend between the first end 14 of the base 12 and the second end 16 of the base 12 and between the top side 18 of the base 12 and the bottom side 20 of the base 12.

A plurality of wheels is coupled to the base 12 and is configured for movably positioning the plurality of wheels on a support surface. The plurality of wheels comprises a pair of caster wheels 28 and a pair of lateral wheels 30. Each caster wheel 28 is rotatably coupled to an associated caster bracket 32, each caster bracket 32 being pivotably coupled to the bottom side 20 of the base 12 adjacent the first end 14 of the base 12 and adjacent an associated one of the front side 22 of the base 12 and the back side 24 of the base 12. Each lateral wheel 30 is rotatably coupled to an associated one of the front side 22 of the base 12 and the back side 24 of the base 12. The pair of lateral wheels 30 is rotatable about a lateral wheel axis perpendicular to the front side 22 of the base 12. The pair of lateral wheels 30 is also positioned proximate the second end 16 of the base 12. Alternatively, the device 10 may have a different number of wheels coupled to the base 12. The wheels may rotate about an axis which is static relative to the base 12 or may have movable axes as in the caster wheels 28.

A grill compartment 34 is coupled to the base 12 and has a perimeter wall 36. The perimeter wall 36 has a grill ledge extending along an inner surface 40 of the perimeter wall 36. The grill also has a front side 42 and a back side 44, wherein the front side 42 of the grill compartment 34 and the front side 22 of the base 12 facing a same direction. The grill compartment 34 has a grill lid 48 which is pivotably coupled to the grill compartment 34 at an edge of the back side 44 of the grill compartment 34 and a top side 46 of the grill compartment 34. The grill lid 48 is movable between a closed position 50 of the grill lid 48 and an open position 52 of the grill lid 48. A grill grating 54 is positionable on the grill ledge and has a top side which is positioned to be horizontal when the grill grating 54 is positioned on the grill ledge. The grill grating 54 is configured for supporting a first quantity of food on the top side of the grill grating 54. The grill grating 54 has a bottom side 58 opposite the top side of the grill grating 54.

A plurality of legs 60 is coupled to and extends between the top side 18 of the base 12 and a bottom side of the grill compartment 34. A tray 62 extends from the front side 42 of the grill compartment 34.

A smoker cabinet 64 is coupled to and extends laterally from the grill compartment 34, wherein the smoker cabinet 64 is in environmental communication with the grill compartment 34. The smoker cabinet 64 has a smoker door 66 which is pivotably coupled to the smoker cabinet 64 opposite the grill compartment 34. The smoker door 66 is movable between a closed position 68 of the smoker door 66 and an open position 70 of the smoker door 66. The smoker cabinet 64 has a plurality of smoker ledges 72 extending along an inner surface 76 of a cabinet wall 74 of the smoker cabinet 64 where each of a plurality of smoker gratings 78 is positionable on an associated smoker ledge. Each smoker grating 78 has a top surface that is positioned horizontally when the associated smoker grating 78 is positioned on the associated smoker ledge, and each smoker grating 78 is configured for supporting a second quantity of food on the associated top surface. The device 10 may alternatively have only a single smoker grating 78 positionable on one or more smoker ledges 72.

A smoke stack 82 is coupled to the smoker cabinet 64 and extends away from the base 12. The smoke stack 82 is in environmental communication with the smoker cabinet 64 and is configured for releasing a flow of smoke through a smoke stack outlet end 86 of the smoke stack 82. A smoke stack valve 84 is coupled to the smoke stack 82, wherein the smoke stack valve 84 is movable between a closed position of the smoke stack valve 84 and an open position of the smoke stack valve 84. The smoke stack valve 84 prevents the flow of smoke from traveling through the smoke stack 82 when closed.

A wood chip box 88 is coupled to the grill compartment 34 opposite the smoker cabinet 64 and is in environmental communication with the grill compartment 34 through a plurality of wood chip box holes 90 but may have a single wood chip box hole 90. The wood chip box 88 has a wood chip box door 92, which is pivotably coupled to the wood chip box 88 opposite the grill compartment 34 and is movable between a closed position 94 of the wood chip box door 92 and an open position 96 of the wood chip box door 92. The wood chip box door 92 may be positioned in another location of the wood chip box 88.

Each of a plurality of vent holes 98 extends through the wood chip box door 92. The wood chip box 88 is in environmental communication with an exterior atmosphere through the plurality of vent holes 98. A vent door 100 is rotatably coupled to the wood chip box door 92 and is movable between a closed position of the vent door 100 and an open position of the vent door 100 to close and open the plurality of vent holes 98 respectively. The vent door 100 and the plurality of vent holes 98 cooperate to define a plurality of apertures 106. The vent door 100 is positionable to adjust a size of each aperture, wherein the plurality of apertures 106 is configured to receive a flow of air and regulate a rate of the flow of air based on each size of each aperture. Alternatively, the wood chip box 88 may have only a single vent hole 98. The single vent hole 98 or plurality of vent holes 98 may extend through a different boundary of the wood chip box 88 than the wood chip box door 92. If only a single vent hole 98 is present, the vent door 100 and the single vent hole 98 may cooperate to define only a single aperture. Additionally, the vent door 100 may be movable pivotably, slidably, or the like instead of rotatably. In any case, the vent door 100 is positionable to adjust the size of either the single aperture or each of the plurality of apertures 106.

A hitch mount 108 is coupled to the top side 18 of the base 12. The hitch mount 108 is elongated along a central longitudinal axis perpendicular to the front side 22 of the base 12, has a first end 110 adjacent the front side 22 of the base 12, and has a second end 112 extending laterally from the back side 24 of the base 12. The hitch mount 108 is configured to be couplable to a standard hitch receiver.

An electric heating element 114 is couplable to the inner surface 40 of the perimeter wall 36 of the grill compartment 34 proximate the bottom side 58 of the grill grating 54. The electric heating element 114 is configured for converting a flow of electrical power from an electrical power source into a flow of heat. An electric control 116 is coupled to an outer surface 118 of the perimeter wall 36 of the grill compartment 34 and electrically coupled to the electric heating element 114 when the electric heating element 114 is coupled to the grill compartment 34. The electric control 116 is positioned opposite the electric heating element 114 across the perimeter wall 36 when the electric heating element 114 is coupled to the grill compartment 34 but may be positioned on a different portion of the perimeter wall 36 of the grill compartment 34. The electric control 116 is configured for regulating a rate of the flow of electrical power from the electrical power source to the electric heating element 114. The electric control 116 includes a dial 120 which is pivotably positionable to determine the rate of the flow of electrical power based on the position of the dial 120.

Each of a plurality of gas burners 122 is couplable to the inner surface 40 of the perimeter wall 36 of the grill compartment 34, wherein each gas burner 122 is configured to receive an associated flow of gas from a gas tank 134. Each gas burner 122 has a plurality of exit holes 124 facing the bottom side 58 of the grill grating 54 which are configured for releasing the associated flow of gas. Each of a plurality of gas valves 136 is coupled to an outer surface 118 of the perimeter wall 36 of the grill compartment 34. Each gas valve 136 is positioned opposite the associated gas burner 122 across the perimeter wall 36 when the associated gas burner 122 is coupled to the grill compartment 34 but may have an alternative position on the perimeter wall 36 of the grill. Each gas valve 136 is fluidically coupled to an associated gas burner 122 when the associated gas burner 122 is coupled to the grill compartment 34 and is configured for regulating a rate of the associated flow of gas from the gas tank 134 to the associated gas burner 122. Additionally, the device 10 may only use a single gas burner 122 with a single gas valve 136 for regulating the rate of a single flow of gas to the single gas burner 122.

The device 10 may also include a smoke stack topper 126 which is removably coupled to the smoke stack 82. The smoke stack topper 126 receives the smoke stack outlet end 86 and encases a portion of the smoke stack 82. The smoke stack topper 126 is in environmental communication with the smoke stack 82 and is configured to receive the flow of smoke from the smoke stack 82 and release the flow of smoke through a smoke stack topper outlet 128. The smoke stack topper 126 has an outer surface 130 having a shape of a miniaturized skull of a steer with the smoke stack topper outlet 128 positioned adjacent a nasal bone portion 132 of the outer surface 130 of the smoke stack topper 126. The smoke stack topper 126 is configured to kinematically depict an action of a skull of a steer exhaling the flow of smoke.

In use, the hitch mount 108 of the device 10 is coupled to a standard hitch receiver of an automobile for transporting the device 10 to a desired use location. The device 10 is coupled so that the front side 42 of the grill compartment 34 faces away from the automobile but may be coupled so that the front side 42 of the grill compartment 34 faces toward the automobile. After transporting the device 10 to the desired use location, the device 10 can be used to cook the first quantity of food and/or the second quantity of food while coupled to the automobile or may be uncoupled for moving to another area of the desired use location. If uncoupled, the wheels of the device 10 may be movably positioned on the support surface at the desired use location.

After positioning the device 10, the grill grating 54 may be positioned on the grill ledge and each smoker grating 78 may be positioned on the associated smoker ledge. The first quantity of food is placed on the grill grating 54, the second quantity of food is placed on one or more of the smoker gratings 78, or both the first quantity of food is placed on the grill grating 54 and the second quantity of food is placed on one or more of the smoker gratings 78. One or more cooking methods are chosen from smoking, charcoal grilling, gas grilling, and electric grilling, and the first quantity of food and/or the second quantity of food is cooked to a user's desired result.

Each cooking method will now be described in more detail. To cook by smoking with the device 10, wood chips or other smoke producing materials are placed in the wood chip box 88 and ignited by the user, and the wood chip box door 92 is closed. When the grill lid 48 and the smoker door 66 are each closed, the flow of smoke produced by the ignited wood chips or other smoke producing materials travels into the grill compartment 34 and the smoker cabinet 64, imparting smoke flavor to and cooking the first quantity of food if placed in the grill compartment 34 and the second quantity of food if placed in the smoker cabinet 64. The user may position the vent door 100 as desired to regulate the rate of the flow of air into the wood chip box 88, and thus a rate of combustion of the wood chips or other smoke producing materials. The user may also open and close the smoke stack valve 84 of the smoker to permit or prevent the release of the flow of smoke through the smoke stack outlet end 86 respectively as desired by the user.

To cook by charcoal grilling, charcoal is placed in the grill compartment 34 below the grill ledge and ignited by the user. Then the grill grating 54 is positioned on the grill ledge and the first quantity of food is placed on the grill grating 54. As the charcoal combusts, it will emit a flow of radiant heat which will cook the first quantity of food. The user may adjust a rate of combustion of the charcoal by positioning the vent door 100 to regulate the rate of the flow of air through the plurality of apertures 106. Opening or closing the gas lid and opening or closing the smoke stack valve 84 may also affect the rate of the flow of air, and thus the rate of combustion of the charcoal.

To cook by gas grilling, the plurality of gas burners 122 is coupled to the grill compartment 34 and the grill grating 54 is placed on the grill ledge. Each of the plurality of gas valves 136 are adjusted to regulate the rate of the associated flow of gas to each gas burner 122, and each associated flow of gas released from the plurality of gas burners 122 is ignited by the user. The first quantity of food is placed on the grill grating 54. Each associated flow of gas combusts, cooking the first quantity of food. A rate of combustion of each flow of gas may be regulated by regulating the rate of the associated flow of gas by adjusting the associated gas valve 136.

To cook by electric grilling, the electric heating element 114 is coupled to the grill compartment 34, the grill grating 54 is placed on the grill ledge, and the first quantity of food is placed on the grill grating 54. The user positions the dial 120 of the electric control 116 to regulate the rate of the flow of electrical power to the electric heating element 114, wherein the electric heating element 114 converts the flow of electrical power to the flow of heat, cooking the first quantity of food. A rate of the flow of heat is responsive to the rate of the flow of electrical power.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable combination grill and smoker device comprising:
   a base;
   a plurality of wheels, said plurality of wheels being coupled to said base, said plurality of wheels being configured for movably positioning said base on a support surface;
   a grill compartment, said grill compartment coupled to said base, said grill compartment having a perimeter wall, said perimeter wall having a grill ledge extending along an inner surface of said perimeter wall, said grill compartment having a grill lid, said grill lid being movable between a closed position of said grill lid and an open position of said grill lid;
   a grill grating, said grill grating being positionable on said grill ledge, said grill grating having a top side, said top side being positioned horizontally when said grill grating is positioned on said grill ledge, said grill grating being configured for supporting a first quantity of food on said top side of said grill grating, said grill grating having a bottom side opposite said top side of said grill grating;
   a smoker cabinet, said smoker cabinet being coupled to and extending laterally from said grill compartment, said smoker cabinet being in environmental communication with said grill compartment, said smoker cabinet having a smoker door, said smoker door being movable between a closed position of said smoker door and an open position of said smoker door, said smoker cabinet having a smoker ledge extending along an inner surface of a cabinet wall of said smoker cabinet;
   a smoker grating, said smoker grating being positionable on said smoker ledge, said smoker grating having a top surface, said top surface of said smoker grating being positioned horizontally when said smoker grating is positioned on said smoker ledge, said smoker grating being configured for supporting a second quantity of food;
   a smoke stack, said smoke stack coupled to said smoker cabinet and extending away from said base, said smoke stack being in environmental communication with said smoker cabinet, said smoke stack being configured for releasing a flow of smoke through a smoke stack outlet end of said smoke stack;
   a wood chip box, said wood chip box being coupled to said grill compartment opposite said smoker cabinet, said wood chip box being in environmental communication with said grill compartment, said wood chip box having a wood chip box door, said wood chip box door being movable between a closed position of said wood chip box door and an open position of said wood chip box door;
   a vent hole, said vent hole extending through a boundary portion of said wood chip box, said wood chip box being in environmental communication with an exterior atmosphere through said vent hole;
   a vent door, said vent door coupled to said wood chip box, said vent door being movable between a closed position of said vent door and an open position of said vent door to close and open said vent hole respectively, said vent door and said vent hole cooperating to define an aperture, said vent door being positionable to adjust a size of said aperture, said aperture being configured to receive a flow of air and regulate a rate of the flow of air based on said size of said aperture;
   a hitch mount, said hitch mount coupled to said base, said hitch mount being configured to be couplable to a hitch receiver;
   an electric heating element, said electric heating element being couplable to said inner surface of said perimeter wall of said grill compartment proximate said bottom side of said grill grating, said electric heating element being configured for converting a flow of electrical power from an electrical power source into a flow of heat; and
   a gas burner, said gas burner being couplable to said inner surface of said perimeter wall of said grill compartment, said gas burner being configured to receive a flow of gas from a gas tank, said gas burner having a plurality of exit holes facing said bottom side of said grill grating, said plurality of exit holes being configured for releasing the flow of gas.

2. The device of claim 1, further comprising a smoke stack valve, said smoke stack valve being coupled to said smoke stack, said smoke stack valve being movable between a closed position of said smoke stack valve and an open position of said smoke stack valve, said smoke stack valve preventing the flow of smoke from traveling through said smoke stack when closed.

3. The device of claim 1, further comprising an electric control, said electric control being coupled to an outer surface of said perimeter wall of said grill compartment and electrically coupled to said electric heating element when said electric heating element is coupled to said grill compartment, said electric control being configured for regulating a rate of the flow of electrical power from the electrical power source to said electric heating element.

4. The device of claim 3, wherein said electric control includes a dial, said dial being pivotably positionable, said electric control determining the rate of the flow of electrical power based on the position of said dial.

5. The device of claim 4, wherein said electric control is positioned opposite said electric heating element across said perimeter wall when said electric heating element is coupled to said grill compartment.

6. The device of claim 1, wherein said gas burner is one of a plurality of gas burners, each said gas burner being couplable to said inner surface of said perimeter wall of said grill compartment, each said gas burner being configured to receive an associated flow of gas from the gas tank, each said gas burner having a plurality of exit holes facing said bottom side of said grill grating, each said plurality of exit holes being configured for releasing the associated flow of gas.

7. The device of claim 6, further comprising a plurality of gas valves, each said gas valve being coupled to an outer surface of said perimeter wall of said grill compartment, each said gas valve being fluidically coupled to an associated gas burner when said associated gas burner is coupled to said grill compartment, each said gas valve being configured for regulating a rate of the associated flow of gas from the gas tank to said associated gas burner.

8. The device of claim 7, wherein each said gas valve is positioned opposite said associated gas burner across said perimeter wall when said associated gas burner is coupled to said grill compartment.

9. The device of claim 1, wherein said smoker ledge is one of a plurality of smoker ledges extending along said inner surface of said cabinet wall, wherein said smoker grating is one of a plurality of smoker gratings, each said smoker grating being positionable on an associated said smoker ledge, each said smoker grating having a top surface, each said top surface of each said smoker grating being positioned horizontally when said associated smoker grating is positioned on said associated smoker ledge, each said smoker grating being configured for supporting a second quantity of food on said associated top surface.

10. The device of claim 1, wherein said base extends from a first end of said base to a second end of said base, each of a top side of said base and a bottom side of said base extending from said first end of said base to said second end of said base, each of a front side of said base and back side of said base extending between said first end of said base and said second end of said base and between said top side of said base and said bottom side of said base.

11. The device of claim 10, wherein said hitch mount is coupled to said top side of said base, said hitch mount being elongated along a central longitudinal axis perpendicular to said front side of said base, said hitch mount having a first end adjacent said front side of said base, said hitch mount having a second end extending laterally from said back side of said base.

12. The device of claim 10, wherein said plurality of wheels comprises a pair of caster wheels and a pair of lateral wheels, each said caster wheel being rotatably coupled to an associated caster bracket, each said caster bracket being pivotably coupled to said bottom side of said base adjacent said first end of said base and adjacent an associated one of said front side of said base and said back side of said base, each said lateral wheel being rotatably coupled to an associated one of said front side of said base and said back side of said base, said pair of lateral wheels being rotatable about a lateral wheel axis perpendicular to said front side of said base, said pair of lateral wheels being positioned proximate said second end of said base.

13. The device of claim 10, further comprising:
a plurality of legs coupled to and extending between said top side of said base and a bottom side of said grill compartment; and
a tray extending from a front side of said grill compartment, said front side of said grill compartment and said front side of said base facing a same direction,
wherein said grill compartment has a back side opposite said front side of said grill compartment, said grill lid being pivotably coupled to said grill compartment at an edge of said back side of said grill compartment and a top side of said grill compartment.

14. The device of claim 10, wherein said smoker door is pivotably coupled to said smoker cabinet opposite said grill compartment.

15. The device of claim 10, wherein:
said wood chip box door is pivotably coupled to said wood chip box opposite said grill compartment,
said wood chip box is in environmental communication with said grill compartment through a plurality of wood chip box holes,
said vent hole is one of a plurality of vent holes, each said vent hole extending through said wood chip box door, said wood chip box being in environmental communication with said exterior atmosphere through said plurality of vent holes,
said vent door is rotatably coupled to said wood chip box door, said vent door being movable between a closed position of said vent door and an open position of said vent door to close and open said plurality of vent holes respectively, said vent door and said plurality of vent holes cooperating to define a plurality of apertures, said vent door being positionable to adjust a size of each said aperture, said plurality of apertures being configured to receive a flow of air and regulate a rate of the flow of air based on each said size of each said aperture.

16. The device of claim 1, further comprising a smoke stack topper, said smoke stack topper being removably coupled to said smoke stack, said smoke stack topper receiving said smoke stack outlet end and encasing a portion of said smoke stack, said smoke stack topper being in environmental communication with said smoke stack, said smoke stack topper being configured to receive the flow of smoke from said smoke stack and release the flow of smoke through a smoke stack topper outlet, said smoke stack topper having an outer surface, said outer surface of said smoke stack topper having a shape of a miniaturized skull of a steer, said smoke stack topper outlet being positioned adjacent a nasal bone portion of said outer surface of said smoke stack topper, said smoke stack topper being configured to kinematically depict an action of a skull of a steer exhaling the flow of smoke.

17. A portable combination grill and smoker device comprising:
a base, wherein said base extends from a first end of said base to a second end of said base, each of a top side of said base and a bottom side of said base extending from said first end of said base to said second end of said base, each of a front side of said base and back side of said base extending between said first end of said base and said second end of said base and between said top side of said base and said bottom side of said base;
a plurality of wheels, said plurality of wheels being coupled to said base, said plurality of wheels being configured for movably positioning said base on a support surface, wherein said plurality of wheels comprises a pair of caster wheels and a pair of lateral wheels, each said caster wheel being rotatably coupled to an associated caster bracket, each said caster bracket being pivotably coupled to said bottom side of said base adjacent said first end of said base and adjacent an associated one of said front side of said base and said back side of said base, each said lateral wheel being rotatably coupled to an associated one of said front side of said base and said back side of said base, said pair of lateral wheels being rotatable about a lateral wheel axis perpendicular to said front side of said base, said pair of lateral wheels being positioned proximate said second end of said base;
a grill compartment, said grill compartment coupled to said base, said grill compartment having a perimeter wall, said perimeter wall having a grill ledge extending along an inner surface of said perimeter wall, said grill compartment having a front side and a back side, said front side of said grill compartment and said front side of said base facing a same direction, said grill compartment having a grill lid, said grill lid being pivotably coupled to said grill compartment at an edge of said back side of said grill compartment and a top side of said grill compartment, said grill lid being movable between a closed position of said grill lid and an open position of said grill lid;

a grill grating, said grill grating being positionable on said grill ledge, said grill grating having a top side, said top side being positioned horizontally when said grill grating is positioned on said grill ledge, said grill grating being configured for supporting a first quantity of food on said top side of said grill grating, said grill grating having a bottom side opposite said top side of said grill grating;

a plurality of legs coupled to and extending between said top side of said base and a bottom side of said grill compartment;

a tray extending from said front side of said grill compartment;

a smoker cabinet, said smoker cabinet being coupled to and extending laterally from said grill compartment, said smoker cabinet being in environmental communication with said grill compartment, said smoker cabinet having a smoker door, wherein said smoker door is pivotably coupled to said smoker cabinet opposite said grill compartment, said smoker door being movable between a closed position of said smoker door and an open position of said smoker door, said smoker cabinet having a plurality of smoker ledges extending along an inner surface of a cabinet wall of said smoker cabinet;

a plurality of smoker gratings, each said smoker grating being positionable on an associated said smoker ledge, each said smoker grating having a top surface, each said top surface of each said smoker grating being positioned horizontally when said associated smoker grating is positioned on said associated smoker ledge, each said smoker grating being configured for supporting a second quantity of food on said associated top surface;

a smoke stack, said smoke stack coupled to said smoker cabinet and extending away from said base, said smoke stack being in environmental communication with said smoker cabinet, said smoke stack being configured for releasing a flow of smoke through a smoke stack outlet end of said smoke stack;

a smoke stack valve, said smoke stack valve being coupled to said smoke stack, said smoke stack valve being movable between a closed position of said smoke stack valve and an open position of said smoke stack valve, said smoke stack valve preventing the flow of smoke from traveling through said smoke stack when closed;

a wood chip box, said wood chip box being coupled to said grill compartment opposite said smoker cabinet, wherein said wood chip box is in environmental communication with said grill compartment through a plurality of wood chip box holes, said wood chip box having a wood chip box door, wherein said wood chip box door is pivotably coupled to said wood chip box opposite said grill compartment, said wood chip box door being movable between a closed position of said wood chip box door and an open position of said wood chip box door;

a plurality of vent holes, each said vent hole extending through said wood chip box door, said wood chip box being in environmental communication with an exterior atmosphere through said plurality of vent holes;

a vent door, wherein said vent door is rotatably coupled to said wood chip box door, said vent door being movable between a closed position of said vent door and an open position of said vent door to close and open said plurality of vent holes respectively, said vent door and said plurality of vent holes cooperating to define a plurality of apertures, said vent door being positionable to adjust a size of each said aperture, said plurality of apertures being configured to receive a flow of air and regulate a rate of the flow of air based on each said size of each said aperture;

a hitch mount, wherein said hitch mount is coupled to said top side of said base, said hitch mount being elongated along a central longitudinal axis perpendicular to said front side of said base, said hitch mount having a first end adjacent said front side of said base, said hitch mount having a second end extending laterally from said back side of said base, said hitch mount being configured to be couplable to a hitch receiver;

an electric heating element, said electric heating element being couplable to said inner surface of said perimeter wall of said grill compartment proximate said bottom side of said grill grating, said electric heating element being configured for converting a flow of electrical power from an electrical power source into a flow of heat;

an electric control, said electric control being coupled to an outer surface of said perimeter wall of said grill compartment and electrically coupled to said electric heating element when said electric heating element is coupled to said grill compartment, wherein said electric control is positioned opposite said electric heating element across said perimeter wall when said electric heating element is coupled to said grill compartment, said electric control being configured for regulating a rate of the flow of electrical power from the electrical power source to said electric heating element, wherein said electric control includes a dial, said dial being pivotably positionable, said electric control determining the rate of the flow of electrical power based on the position of said dial;

a plurality of gas burners, each said gas burner being couplable to said inner surface of said perimeter wall of said grill compartment, each said gas burner being configured to receive an associated flow of gas from a gas tank, each said gas burner having a plurality of exit holes facing said bottom side of said grill grating, each said plurality of exit holes being configured for releasing the associated flow of gas;

a plurality of gas valves, each said gas valve being coupled to an outer surface of said perimeter wall of said grill compartment, wherein each said gas valve is positioned opposite said associated gas burner across said perimeter wall when said associated gas burner is coupled to said grill compartment, each said gas valve being fluidically coupled to an associated gas burner when said associated gas burner is coupled to said grill compartment, each said gas valve being configured for regulating a rate of the associated flow of gas from the gas tank to said associated gas burner.

18. The device of claim 17, further comprising a smoke stack topper, said smoke stack topper being removably coupled to said smoke stack, said smoke stack topper receiving said smoke stack outlet end and encasing a portion of said smoke stack, said smoke stack topper being in environmental communication with said smoke stack, said smoke stack topper being configured to receive the flow of smoke from said smoke stack and release the flow of smoke through a smoke stack topper outlet, said smoke stack topper having an outer surface, said outer surface of said smoke stack topper having a shape of a miniaturized skull of a steer, said smoke stack topper outlet being positioned adjacent a nasal bone portion of said outer surface of said smoke stack topper, said smoke stack topper being configured to kinematically depict an action of a skull of a steer exhaling the flow of smoke.

* * * * *